(12) United States Patent
Byun et al.

(10) Patent No.: US 9,713,015 B2
(45) Date of Patent: Jul. 18, 2017

(54) METHOD BY WHICH BASE STATION TRANSMITS SIGNAL FOR COVERAGE COORDINATION IN WIRELESS COMMUNICATION SYSTEM AND DEVICE FOR SAME

(71) Applicant: LG Electronics Inc., Seoul (KR)

(72) Inventors: Daewook Byun, Seoul (KR); Insun Lee, Seoul (KR); Jian Xu, Seoul (KR); Kyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/889,912

(22) PCT Filed: May 9, 2014

(86) PCT No.: PCT/KR2014/004142
§ 371 (c)(1),
(2) Date: Nov. 9, 2015

(87) PCT Pub. No.: WO2014/182114
PCT Pub. Date: Nov. 13, 2014

(65) Prior Publication Data
US 2016/0088493 A1 Mar. 24, 2016

Related U.S. Application Data

(60) Provisional application No. 61/821,736, filed on May 10, 2013, provisional application No. 61/898,467, filed on Oct. 31, 2013.

(51) Int. Cl.
*H04W 16/24* (2009.01)
*H04W 52/02* (2009.01)
(Continued)

(52) U.S. Cl.
CPC .......... *H04W 16/24* (2013.01); *H04W 36/22* (2013.01); *H04W 52/0206* (2013.01); *H04W 92/20* (2013.01); *Y02B 60/50* (2013.01)

(58) Field of Classification Search
CPC . H04W 16/24; H04W 36/22; H04W 52/0206; H04W 92/20
See application file for complete search history.

(56) References Cited

U.S. PATENT DOCUMENTS

2005/0048963 A1* 3/2005 Kubler .................. H04W 16/06
455/423
2009/0067339 A1* 3/2009 Byun .................... H04W 16/08
370/252
(Continued)

FOREIGN PATENT DOCUMENTS

EP 2568753 A1 3/2013
EP 2 584 842 A1 4/2013
(Continued)

OTHER PUBLICATIONS

Written Opinion and International Search Report issued in corresponding International Patent Application No. PCT/KR2014/004142 dated Sep. 2, 2014.
(Continued)

*Primary Examiner* — Nathan Mitchell
(74) *Attorney, Agent, or Firm* — Morgan, Lewis & Bockius LLP

(57) ABSTRACT

The present invention relates to a method by which a base station transmits a signal for coverage coordination in a wireless communication system and a device for the same. According to one embodiment of the present invention, a coordinating base station receives coverage related information from each of a first base station and a second base station, performs a coverage coordination procedure by using the coverage related information of the first and
(Continued)

second base stations and transmits a signal for coverage coordination, which is determined according to the result of performing the coverage coordination procedure, to each of the first and second base stations, wherein the coverage coordination procedure includes determining whether the second base station can supplement the coverage of the first base station when the first base station switches to an idle mode.

8 Claims, 8 Drawing Sheets

(51) Int. Cl.
*H04W 36/22* (2009.01)
*H04W 92/20* (2009.01)

(56) References Cited

U.S. PATENT DOCUMENTS

| | | | | |
|---|---|---|---|---|
| 2011/0044284 | A1* | 2/2011 | Voltolina | H04W 24/02 370/331 |
| 2011/0170466 | A1* | 7/2011 | Kwun | H04W 52/0235 370/311 |
| 2012/0004009 | A1* | 1/2012 | Lindoff | H04W 52/0232 455/522 |
| 2013/0090147 | A1 | 4/2013 | Yamazaki | |
| 2013/0150044 | A1 | 6/2013 | Zhang et al. | |
| 2013/0310024 | A1* | 11/2013 | Jung | H04W 16/20 455/423 |
| 2014/0018077 | A1 | 1/2014 | Zhong et al. | |
| 2014/0362750 | A1* | 12/2014 | Song | H04W 36/0072 370/311 |
| 2015/0327259 | A1* | 11/2015 | Murakami | H04W 52/0206 370/230 |
| 2016/0150420 | A1* | 5/2016 | Byun | H04W 16/08 370/312 |
| 2016/0174149 | A1* | 6/2016 | Byun | H04W 16/24 455/418 |

FOREIGN PATENT DOCUMENTS

| | | |
|---|---|---|
| WO | 2012/019556 A1 | 2/2012 |
| WO | 2012/127325 A2 | 9/2012 |

OTHER PUBLICATIONS

CMCC et al., "Addition of Energy Saving Function for Inter-RAT Scenario," R3-121479, 3GPP TSG-RAN WG3 #76, Prague, Czech, May 21-25, 2012.
Ericsson et al., "Way Forward on UE Measurement Method ("Probing") and Signaling," R3-121459, 3GPP TSG-RAN WG3 #76, Prague, Czech, May 21-25, 2012.
Huawei et al., "UE Measurement Method," R3-121059, 3GPP TSG-RAN WG3 Meeting #75-bis, Prague, Czech, May 21-25, 2012.
Extended European Search Report issued in corresponding European Patent Application No. 14795517.3 dated Nov. 11, 2016.

* cited by examiner

☒ Compensation Cell
▨ Energy Saving Cell
▢ Dormant cell

☒ Compensation Cell
▨ Energy Saving Cell
▢ Dormant cell

METHOD BY WHICH BASE STATION TRANSMITS SIGNAL FOR COVERAGE COORDINATION IN WIRELESS COMMUNICATION SYSTEM AND DEVICE FOR SAME

TECHNICAL FIELD

The present invention relates to a method by which a base station transmits a signal for coverage coordination in a wireless communication system and a device for the same.

BACKGROUND ART

Generally, a wireless communication system that includes a base station (BS) and a user equipment (UE) provides the user equipment with various kinds of communication services including voice or data through one or more base stations. Generally, one base station may provide one or more cells.

The recent trend in a structure of the wireless communication system is that a macro cell based centralized base station type corresponding to a conventional vertical layer is being switched to a base station type in which various types of small cells such as a pico cell and a femto cell interact with a macro cell.

Meanwhile, as efforts to reduce the greenhouse effect and environment destruction, which are caused by excessive emission of $CO_2$, have been increased, an element that best emits $CO_2$ in the field of mobile communication is regarded as a power of a base station, and an important issue is how the power of the base station may be reduced or how the power of the base station may be used efficiently.

It has been until recently focused on efficient use in a power of a user equipment and decrease of energy consumption of the user equipment to increase portability of the user equipment. However, in the future, the power of the base station may be used efficiently to reduce energy consumption, whereby emission of $CO_2$ may be reduced and operation expenditure (OPEX) may be saved.

Therefore, the need of technology development for reducing power consumption of the base station through efficient energy consumption of the base station has been increased, and from Release 9 in the 3GPP (3rd Generation Partnership Project), energy saving solution in view of the base station has been discussed, and in Release 12, technologies for energy saving of long term evolution (LTE) base stations at an off-peak time have been discussed.

For energy saving of the base station, it may be considered that the base station is shifted to a power-off state or idle mode. In this case, the base station that is shifted to the power-off mode or idle mode may perform handover for user equipments located in its coverage area to neighboring base stations that may compensate for a coverage of the base station.

However, since there is no separate signaling procedure between the base station and the neighboring base stations, a problem may occur in that the neighboring base stations may not compensate for the coverage of the base station normally, whereby handover may be failed or service quality may remarkably be deteriorated.

In this respect, it is required that a method for enabling the neighboring base station to compensate for the coverage of the base station without any lack should be introduced, and a solution for this method will be required.

DISCLOSURE

Technical Problem

An object of the present invention devised to solve one or more problems due to limitations and disadvantages of the related art is to provide a method for transmitting a signal for coverage coordination from a base station in a wireless communication system.

Another object of the present invention is to provide a method for enabling a coordinating base station to perform coverage coordination so as to allow neighboring base stations to compensate for a coverage of a base station desired to be shifted to an idle mode.

Still another object of the present invention is to provide a method for enabling a base station desired to be shifted to an idle mode and neighboring base stations to recognize a coordinating base station.

Further still another object of the present invention is to provide a method for enabling a user equipment to stably perform communication even though a base station desired to be shifted to an idle mode is shifted to the idle mode.

Further still another object of the present invention is to provide a device for supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, as embodied and broadly described herein, a method for transmitting a signal for coverage coordination from a base station in a wireless communication system, the method comprising: receiving, by a coordinating base station, coverage related information from each of a first base station and a second base station; performing a coverage coordination procedure by using the coverage related information of the first and second base stations; and transmitting a coverage coordinating signal determined in accordance with the result of the coverage coordinating procedure to each of the first and second base stations, wherein the coverage coordination procedure includes determining whether the second base station compensate for a coverage of the first base station when the first base station is switched to an idle mode.

In another aspect of the present invention, further comprising: configuring an X2 interface between the coordinating base station and each of the first and second base stations, wherein when the X2 interface is configured, it is notified that the coordinating base station determines whether to perform coverage coordination or not.

In another aspect of the present invention, the coverage related information of the first base station includes an idle mode switching request of the first base station, and the coverage related information of the second base station includes information on a coverage area that may be compensated by the second base station.

In another aspect of the present invention, the coverage related information of the first base station is received from the first base station if cell load of the first base station maintains a predetermined threshold value or less for a predetermined time.

In another aspect of the present invention, further comprising: receiving an idle mode switching request cancellation message indicating that switching to an idle mode will not be performed from the first base station if cell load of the first base station exceeds a predetermined threshold value after receiving the coverage related information of the first base station, wherein the idle mode switching request and the idle mode switching request cancellation message of the first base station are identified from each other as a value of 0 or 1.

In another aspect of the present invention, if it is determined that the second base station compensate for a coverage of the first base station as a result of the coverage coordination procedure, the coverage coordinating signal transmitted to the first base station includes an idle mode switching indication message, and the coverage coordinating signal transmitted to the second base station includes a coverage compensation indication message indicating coverage compensation of the first base station.

In another aspect of the present invention, the idle mode switching indication message indicates that the first base station performs handover for one or more user equipments located within a service area of the first base station to the second base station and then is switched to an idle mode.

In another aspect of the present invention, the coverage compensation indication message indicates that the second base station compensates for the coverage of the first base station, the coverage is compensated in such a manner that the second base station continuously provides one or more user equipments receiving a service from the first base station, with the service.

In another aspect of the present invention, the coverage coordinating signal of the first base station includes an idle mode switching unavailable message if coverage compensation of the first base station is not possible.

In another aspect of the present invention, a device for transmitting a signal for coverage coordination in a wireless communication system, the device comprising: a radio frequency (RF) unit that includes a transmitter and a receiver; and a processor connected with the transmitter and the receiver, supporting communication of the device, wherein the processor configured to: receive coverage related information from each of a first base station and a second base station, perform a coverage coordination procedure by using the coverage related information of the first and second base stations, and transmit a coverage coordinating signal determined in accordance with the result of the coverage coordination procedure to each of the first and second base stations, and the coverage coordination procedure includes determining whether the second base station compensates for a coverage of the first base station when the first base station is switched to an idle mode.

Advantageous Effects

According to the present invention, a base station may transmit a signal for coverage coordination in a wireless communication system.

Also, according to the present invention, a coordinating base station may perform coverage coordination to allow neighboring base stations to compensate for a coverage of a base station desired to be shifted to an idle mode.

Also, according to the present invention, a base station desired to be shifted to an idle mode and neighboring base stations may recognize a coordinating base station.

Also, according to the present invention, a user equipment may stably perform communication even though a base station desired to be shifted to an idle mode is shifted to the idle mode.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. However, technical features of the present invention are not limited to a specific drawing, and features disclosed in each drawing may be configured as a new embodiment by combination. Reference numerals in each drawing mean structural elements. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following detailed description includes detailed matters to provide full understanding of the present invention.

However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In the specification, when a part "comprises" or "includes" an element, it means that the part further comprises or includes another element unless otherwise mentioned.

Also, the term " . . . module" disclosed in the specification means a unit for processing at least one function or operation, and may be implemented by hardware, software or combination of hardware and software. Moreover, it is to be understood that the singular expression "a" (or "an"), "one" and "a related similar word" used in this specification includes the plural expression unless defined differently on the context of the present invention.

Specific terms used in the embodiments of the present invention are provided to assist understanding of the present invention, and all terms used herein including technical or scientific terms have the same meaning as those generally understood by the person with ordinary skill in the art to which the present invention pertains. Various modifications may be made in the specific terms within the range that they do not depart from technical spirits of the present invention.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Figure 1:
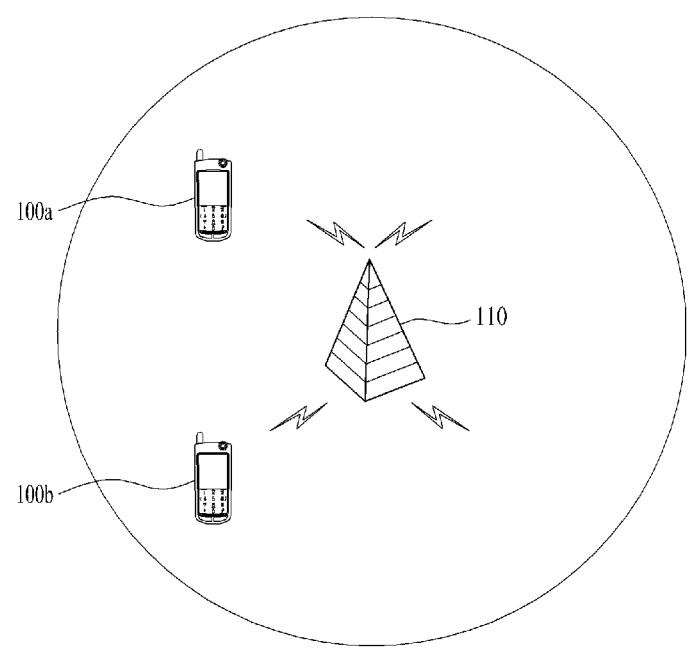
FIG. 1 is a diagram illustrating a general wireless access network system to which the present invention may be applied.

FIG. 1 is a diagram illustrating a general wireless access network system to which the present invention may be applied.

In FIG. 1, a general wireless access network system to which the present invention may be applied may include a base station (BS) 110 and one or more user equipments (UE) 100a and 100b.

In the present invention, the base station 110 means a terminal node of a network that directly performs communication with the user equipments 100a and 100b. Also, a specific operation described as being performed by the base station 110 may be performed by an upper node of the base station as the case may be.

In other words, it will be apparent that various operations performed for communication with the user equipment in the network which includes a plurality of network nodes along with the base station 110 may be performed by the base station or network nodes other than the base station.

In the present invention, the base station 110 may be replaced with terms such as a fixed station, Node B, eNode B (eNB), and access point (AP).

Also, the user equipment may be replaced with terms such as Terminal, MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, and D2D device (Device-to-Device).

The embodiments of the present invention may be implemented in at least one of wireless access systems, i.e., IEEE system, 3GPP system, 3GPP LTE system, 3GPP LTE-A (LTE-Advanced) system, and 3GPP2 system, and may be supported by standard documents disclosed in at least one of the wireless access systems.

Figure 2:
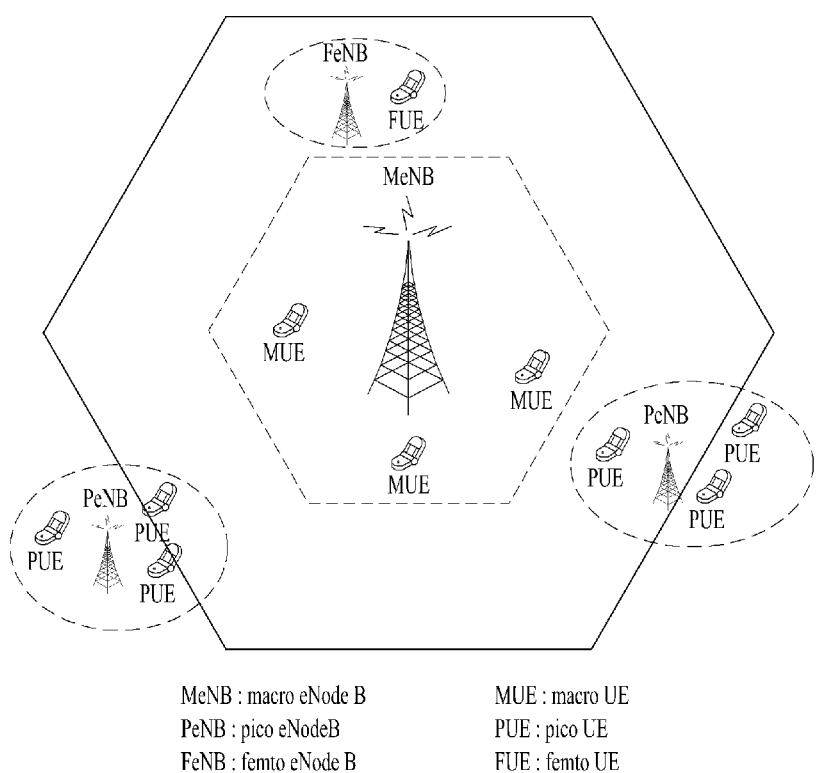
FIG. 2 is a diagram illustrating a heterogeneous network environment to which the present invention may be applied.

FIG. 2 is a diagram illustrating a heterogeneous network environment to which the present invention may be applied.

Adding macro cells to a conventional eNB deployment is inefficient in terms of cost and complexity relative to improved system performance. Therefore, to stably ensure data service such as multimedia data in a future-generation mobile communication system, more interest has been attracted to the introduction of a hierarchical cell structure or heterogeneous cell structure in which small cells (pico cells, femto cells and/or micro cells) for low-power/short-range communication are co-existent in a macro cell-based homogeneous network.

Meanwhile, a heterogeneous network under consideration for a current wireless communication system is configured as illustrated in FIG. 2. Referring to FIG. 2, a plurality of small cells may be co-existent in one macro cell. The base stations of each small cell are allocated resources by cell coordination and service user equipments UEs using the resources.

A coverage which is an area that may provide a user equipment UE with service exists in each of the small cells, and a coverage of a specific small cell may be compensated by a coverage of another neighboring small cell.

Figure 3:
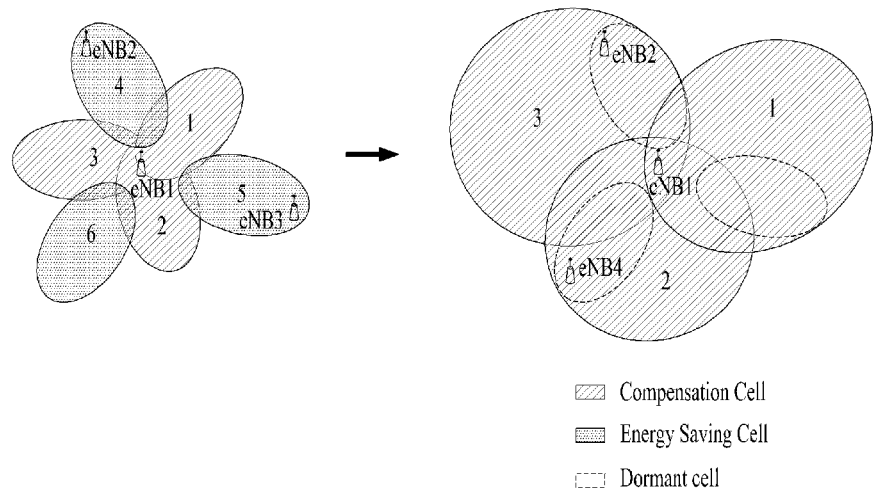
FIG. 3 is a diagram illustrating an environment of a single coverage compensation base station to which the present invention may be applied.
Figure 4:
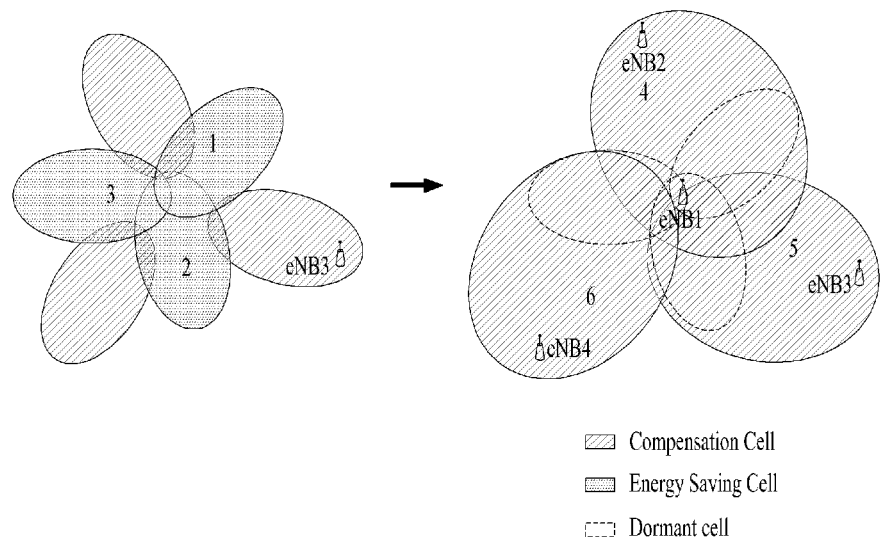
FIG. 4 is a diagram illustrating an environment of multiple coverage compensation base stations to which the present invention may be applied.

FIGS. 3 and 4 are diagrams illustrating an environment of a single coverage compensation base station and an environment of multiple coverage compensation base stations, to which the present invention may be applied.

At off-peak time, a base station almost having no UE that performs communication may exist. In order to reduce energy consumption of the base station, the power of the base station may be switched off or may be shifted to an idle mode, and a neighboring base station may widen its coverage to cover a service area of the base station which is powered off or shifted to the idle mode.

In this case, the base station which is powered off or shifted to the idle mode will be referred to as an energy saving cell or an energy saving base station, and the base station which widens its coverage to cover the area where the power is switched off or which is shifted to the idle mode will be referred to as a compensation cell or a compensation base station.

Two scenarios may be configured as illustrated in FIGS. 3 and 4 in accordance with distribution of the two types of base stations. In FIG. 3, cell 1 to cell 3 are compensation base stations, and cell 4 to cell 6 are energy saving base stations. In FIG. 4, cell 1 to cell 3 are energy saving base stations, and cell 4 to cell 6 are compensation base stations.

In respect of FIGS. 3 and 4, an energy saving approach method exists as follows. The energy saving approach method includes a method for determining an energy saving base station and a compensation base station, a method as to when and how the energy saving base station is powered off or shifted to the idle mode, and a method as to how the compensation base station coordinates its coverage.

The first method for the energy saving approach method is OAM based approach method (Operation and Management based Approach). The OAM based approach method is that the OAM previously configures an energy saving base station and a compensation base station and energy saving base stations are determined to be powered off or shifted to the idle mode on the basis of a proprietary algorithm.

The second method for the energy saving approach method is a signaling based approach method. According to the signaling based approach method, types of respective base stations are previously configured in the same manner as the OAM based approach method. However, according to the signaling based approach method, the time when the energy saving base station is powered off or shifted to the idle mode and thus the method as to how the compensation base station coordinates its coverage are determined through signaling between the base stations.

The third method for the energy saving approach method is an OAM and signaling hybrid based approach method (Hybrid OAM and Signaling based Approach). The OAM and signaling hybrid based approach method is the same as the above two methods in that OAM previously configures types of respective base stations but determines parameter values, which are required to allow the energy saving base station to be powered off or shifted to the idle mode, by communication between the OAM and the base stations.

The present invention especially considers the signaling based approach method of the energy saving approach methods, and also considers the environment of multiple coverage compensation base stations shown in FIG. 4 of two scenarios shown in FIGS. 3 and 4.

In the signaling based approach method, the energy saving base station identifies its load information, and if a load maintains a predetermined threshold value or less for a given time, the energy saving base station determines whether to be powered off or shifted to an idle mode or dormant mode.

Also, this determination of the energy saving base station triggers communication with the compensation base station and transmits a coverage compensation request to the compensation base station (cell) in the form of a request message.

The request message may include coverage related information of the energy saving base station that transmits the request message.

Meanwhile, the compensation base station that has received the request message determines whether the energy saving base station that has transmitted the request message may be powered off or shifted to the idle or dormant mode, and may feed the determined result back to the energy saving base station.

If the energy saving base station is powered off or shifted to the idle or dormant mode in accordance with the determined result, the compensation base station may extend its coverage to compensate for a coverage area served by the energy saving base station.

In the environment of multiple coverage compensation base stations shown in FIG. 4, two or more compensation base stations exist. When the signaling based approach method is applied to the environment of multiple coverage compensation base stations shown in FIG. 4, if a coverage compensated by the compensation base stations is not coordinated, problems of a coverage hole and inter-cell interference may occur.

For example, in FIG. 4, it is assumed that cell 4 and cell 5 have low load and cell 6 has high load so as not to compensate for coverages of cell 1 to cell 3. At this time, if the cell 1 to the cell 3 respectively transmit coverage compensation request messages to the cell 4 to the cell 6, the cell 6 cannot compensate for a coverage due to high load in case of no coverage coordination. On the other hand, the cell 4 and the cell 5 may compensate for their coverage within a possible range considering their load with respect to the cell 1 to the cell 3. If the cell 4 and the cell 5 have low load to perform coverage compensation for the cell 1 to the cell 3, coverage areas of the cell 4 and the cell 5 are superimposed on each other after coverage compensation. In this superimposed area, a problem of inter-cell interference may occur. Also, if the cell 4 and the cell 5 only perform coverage compensation of the cell 1 to the cell 3 under the status of FIG. 4, a coverage hole where coverage compensation is not performed may occur in most of the cell 3.

However, if the coverage compensated by the compensation base stations is coordinated in accordance with one embodiment of the present invention, coverage compensation of the cell 4 and the cell 5 may be coordinated, whereby a superimposed area may not occur if possible, and coverage compensation may be performed so as not to generate a coverage hole.

Therefore, for coverage compensation of the compensation base stations under the status of FIGS. 3 and 4, coverage coordination is required, and a base station, which will handle coverage coordination, will be required. In the present invention, this base station will be defined as a coordinating base station (cell).

Hereinafter, in accordance with one embodiment of the present invention, a method for enabling an energy saving base station desired to be shifted to an idle mode and a compensation base station for compensating for a coverage of the energy saving base station to recognize the coordinating base station and a method for enabling all neighboring compensation base stations to compensate for a coverage of an energy saving base station desired to be shifted to an idle mode as the coordinating base station coordinates its coverage will be described.

Figure 5:
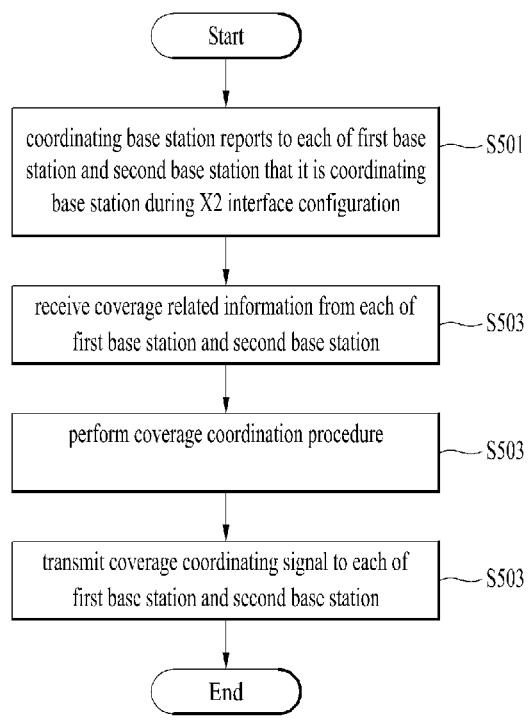
FIG. 5 is a diagram illustrating a flow chart of a method for enabling a base station to transmit a signal for coverage coordination in accordance with one embodiment of the present invention.

FIG. 5 is a diagram illustrating a flow chart of a method for enabling a base station to transmit a signal for coverage coordination in accordance with one embodiment of the present invention.

Referring to FIG. 5, a coordinating base station for coordinating a coverage of an energy saving base station desired to be powered off or shifted to an idle or dormant mode to allow a compensation base station to fully compensate for the coverage of the energy saving base station will be required.

At this time, since the energy saving base station and the compensation base station should know the coordinating base station to transfer a request signal for coverage coordination, the coordinating base station is required to previously notify the energy saving base station and the compensation base station that it corresponds to the coordinating base station.

As a result, according to one embodiment of the present invention, the coordinating base station may indicate that it is the coordinating base station during X2 interface configuration with the energy saving base station and the compensation base station (S501), and this may be implemented by adding a specific field to X2 interface setup request message or X2 interface configuration request message.

In this case, the X2 interface means an interface where communication between base stations is performed in an evolved UMTS terrestrial radio access network (E-UTRAN) of the LTE system that includes a user equipment and a base station.

Meanwhile, each of the energy saving base station and the compensation base station, which know that a specific base station corresponds to the coordinating base station in accordance with the step S501, may transmit coverage related information to the coordinating base station (S502).

At this time, the coverage related information transmitted from the energy saving base station may include an idle mode switching request for requesting power-off of the energy saving base station or shift to an idle or dormant mode, and the coverage related information transmitted from the compensation base station may include information on a coverage area that may be compensated by the compensation base station.

Also, the coverage related information transmitted from the energy saving base station may be transmitted if cell load of the energy saving base station maintains a predetermined threshold value or less for a predetermined time.

Meanwhile, the coordinating base station that has received the coverage related information from each of the energy saving base station and the compensation base station at the step S502 performs a coverage coordination procedure for determining whether the energy saving base station may be powered off or shifted to an idle or dormant mode. In more detail, the coverage coordination procedure may include determining whether the compensation base station may compensate for the coverage of the energy saving base station if the energy saving base station is powered off or shifted to an idle or dormant mode (S503).

After performing the coverage coordination procedure at the step S503, the coordinating base station may transmit a coverage coordinating signal determined in accordance with the result of the coverage coordination procedure to each of the energy saving base station and the compensation base station (S504).

At this time, as a result of the coverage coordination procedure, if it is determined that the compensation base station may compensate for the coverage of the energy saving base station, the coverage coordinating signal transmitted from the coordinating base station to the energy saving base station at the step S504 may include an idle mode switching indication message indicating idle mode switching permission, and the coverage coordinating signal transmitted from the coordinating base station to the compensation base station may include a coverage compensation indication message indicating coverage compensation of the energy saving base station.

However, as a result of the coverage coordination procedure, if it is determined that the compensation base station may not compensate for the coverage of the energy saving base station, the coverage coordinating signal transmitted from the coordinating base station to the energy saving base station at the step S504 may include an idle mode switching unavailable message for not permitting power off or idle mode switching.

Meanwhile, if the energy saving base station receives the coverage coordinating signal, which includes the idle mode switching indication message indicating idle mode switching permission, from the coordinating base station, the energy saving base station performs power-off or switching to the idle mode after performing handover for one or more user equipments located within a service area of the energy saving base station to the compensation base station.

Figure 6:
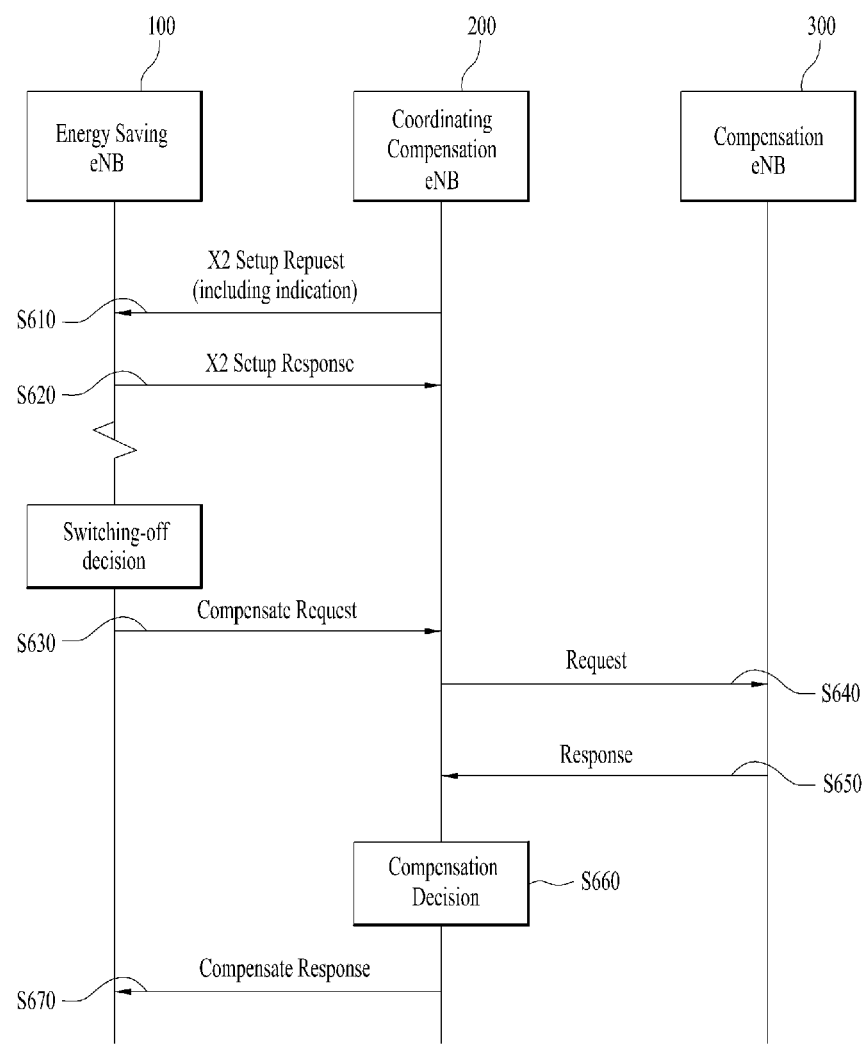
FIG. 6 is a diagram illustrating a method for enabling a base station desired to be shifted to an idle mode and neighboring base stations to recognize a coordinating base station in accordance with one embodiment of the present invention.

FIG. 6 is a diagram illustrating a method for enabling a base station desired to be shifted to an idle mode and neighboring base stations to recognize a coordinating base station in accordance with one embodiment of the present invention.

Referring to FIG. 6, the wireless communication system may include an energy saving base station 100, a coordinating base station 200, and a compensation base station 300.

At this time, since the energy saving base station 100 and the compensation base station 300 should know the coordinating base station to transfer a request signal for coverage coordination, the coordinating base station 200 is required to previously notify the energy saving base station 100 and the compensation base station 300 that it corresponds to the coordinating base station.

As a result, according to one embodiment of the present invention, the coordinating base station 200 may indicate that it is the coordinating base station during X2 interface configuration with the energy saving base station 100, and this may be implemented by adding a specific field to X2 interface setup request message or X2 interface configuration request message (S610).

Meanwhile, although not shown in FIG. 6, the coordinating base station 200 may indicate that it is the coordinating base station during X2 interface configuration with the compensation base station 300, and this may be implemented by adding a specific field to X2 interface setup request message or X2 interface configuration request message.

Meanwhile, at the step S601, the energy saving base station 100 may know a specific base station corresponding to the coordinating base station 200 through the X2 interface setup request message and transmits X2 setup response message in response to the X2 interface setup request message (S620).

Afterwards, if cell load of the energy saving base station maintains a predetermined threshold value or less for a predetermined time, the energy saving base station may determine power-off or switching to the idle or dormant mode. At this time, a compensation request message is transmitted to the coordinating base station known through the step S610 (S630). At this time, the compensation request message may include information on a coverage of the energy saving base station.

The coordinating base station 200 that has received the compensation request message from the energy saving base station 100 transmits a coverage information request message requesting a compensable coverage range to the compensation base station 300 (S640).

The compensation base station 300 that has received the coverage compensation request message from the coordinating base station 200 transmits a coverage information response message, which includes coverage range information indicating its compensable coverage range, to the coordinating base station 200 in response to the coverage compensation request message (S650).

Afterwards, the coordinating base station performs the coverage coordination procedure, which includes determining whether coverage of the compensation base station may compensate for the coverage of the energy saving base station, by comparing the information on a coverage of the energy saving base station 100, which is included in the compensation request message received at the step S630, with the information on a coverage of the compensation base station 300, which is received at the step S640 (S660).

After performing the coverage coordination procedure at the step S660, the coordinating base station 200 may transmit a coverage coordinating signal determined in accordance with the result of the coverage coordination procedure to the energy saving base station 100 (S670). Also, although not shown in FIG. 6, after performing the coverage coordination procedure at the step S660, the coordinating base station 200 may transmit the coverage coordinating signal determined in accordance with the result of the coverage coordination procedure to the compensation base station 300.

At this time, as a result of the coverage coordination procedure, if it is determined that the compensation base station 300 may compensate for the coverage of the energy saving base station 100, the coverage coordinating signal transmitted from the coordinating base station 200 to the energy saving base station 100 at the step S670 may include an idle mode switching indication message indicating idle mode switching permission, and the coverage coordinating signal transmitted from the coordinating base station 200 to the compensation base station 300 may include a coverage compensation indication message indicating coverage compensation of the energy saving base station 100.

However, as a result of the coverage coordination procedure, if it is determined that the compensation base station 300 may not compensate for the coverage of the energy saving base station 100, the coverage coordinating signal transmitted to the energy saving base station 100 at the step S670 may include an idle mode switching unavailable message for not permitting power off or switching to the idle mode.

Meanwhile, if the energy saving base station 100 receives the coverage coordinating signal, which includes the idle mode switching indication message indicating idle mode switching permission, from the coordinating base station 200 at the step S670, although not shown in FIG. 6, the energy saving base station 100 performs power-off or switching to the idle mode after performing handover for one or more user equipments located within a service area of the energy saving base station 100 to the compensation base station 300.

Figure 7:
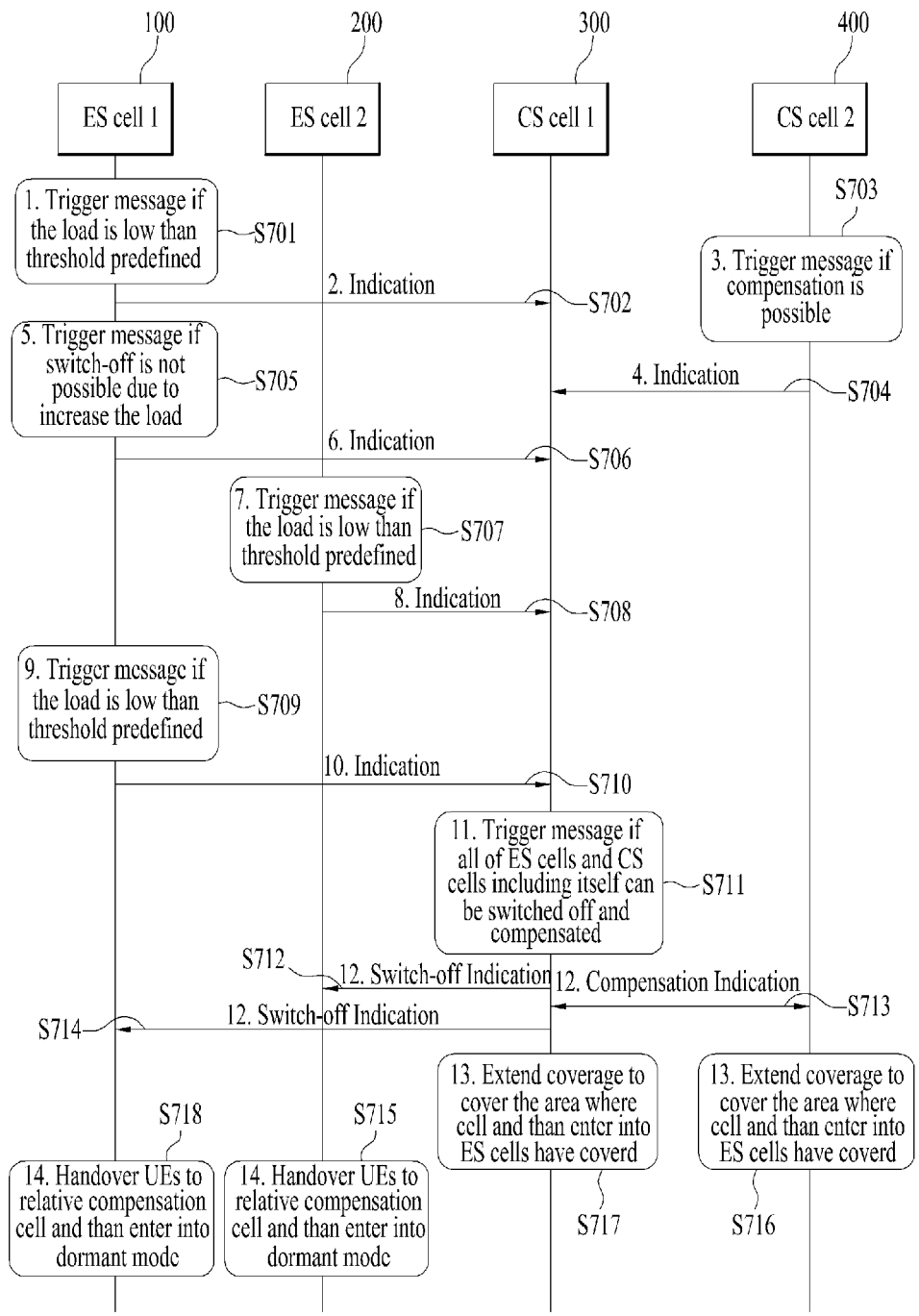
FIG. 7 is a diagram illustrating a method for enabling a base station to transmit a signal for coverage coordination in accordance with one embodiment of the present invention.

FIG. 7 is a diagram illustrating a method for enabling a base station to transmit a signal for coverage coordination in accordance with one embodiment of the present invention.

Referring to FIG. 7, the wireless communication system may include an energy saving base station 1 100, an energy saving base station 2 200, a compensation base station 1 300 and a compensation base station 2 400.

Meanwhile, in FIG. 7, it is assumed that the compensation base station 1 300 serves as a coordinating base station. It is also assumed that the energy saving base station 1 100, the energy saving base station 2 200 and the compensation base station 2 400 recognize that the compensation base station 1 300 is the coordinating base station in accordance with the procedure described in FIG. 6.

If cell load of the energy saving base station 1 100 maintains a predetermined threshold value or less for a predetermined time, the energy saving base station 1 100 may determine power-off or shift to the idle or dormant mode (S701). At this time, the energy saving base station 1 100 transmits a compensation request message or idle mode switching request message to the coordinating base station 300 which is previously known (S702), and the compensation request message or the idle mode switching request message may include information on a coverage of the energy saving base station 1 100.

Meanwhile, the compensation base station 2 400 may determine that coverage compensation is possible if the cell load maintains a predetermined threshold value or less for a predetermined time (S703). As a result, the compensation base station 2 400 may transmit coverage range information indicating its compensable coverage range or information indicating that compensation may be performed to reach the coverage range to the coordinating base station 300 (S704).

Meanwhile, as the cell load maintains a predetermined threshold value or less for a predetermined time at the step S702, the cell load may exceed the predetermined threshold value after the energy saving base station 1 100 transmits the compensation request message or the idle mode switching request message (S705).

In this case, the energy saving base station 1 100 may transmit an idle mode switching request cancellation message indicating that switching to the idle mode will not be performed, to the coordinating base station 300 (S706), and the coordinating base station 300 that has received the idle mode switching request cancellation message may not perform the coverage coordination procedure.

At this time, the compensation request message or the idle mode switching request message at the step S702 and the idle mode switching request cancellation message at the step S706 are transmitted as the same type messages but may be identified from each other as a value of 0 or 1.

Afterwards, the coordinating base station 300 may receive the compensation request message or the idle mode switching request message from the energy saving base station 1 100 and the energy saving base station 2 200, which have determined power off or shift to the idle or dormant mode at the step S707 and the step S709 as the cell load is maintained at a predetermined threshold value or less for a predetermined time (S708, S710).

The coordinating base station 300 that has received the compensation request message or the idle mode switching request message from the energy saving base station 1 100 and the energy saving base station 2 200 performs the coverage coordination procedure that includes determining whether a coverage of the coordinating base station 300 and a coverage of the compensation base station 2 400 may compensate for the coverage of the energy saving base station 1 100 and the energy saving base station 2 200 by comparing information on a coverage of the energy saving base station 1 100 and the energy saving base station 2 200, which is included in the compensation request message or the idle mode switching request message received at the step S708 and the step S710, information on a coverage of the compensation base station 2 400, which is received at the step S704, and information on a coverage that may be compensated by the coordinating base station 300 with one another (S711).

After performing the coverage coordination procedure at the step S711, the coordinating base station 300 may transmit the coverage coordinating signal determined in accordance with the result of the coverage coordination procedure to each of the energy saving base station 1 100, the energy saving base station 2 200, and the compensation base station 2 400 (S712 to S714).

At this time, as a result of the coverage coordination procedure, if it is determined that the coordinating base station 300 and the compensation base station 2 400 may compensate for coverage of the energy saving base station 1 100 and the energy saving base station 2 200, the coverage coordinating signal transmitted from the coordinating base station 300 to the energy saving base station 1 100 and the energy saving base station 2 200 at the steps S712 and S714 may include an idle mode switching indication message indicating idle mode switching permission, and the coverage coordinating signal transmitted from the coordinating base station 300 to the compensation base station 2 400 may include a coverage compensation indication message indicating coverage compensation of the energy saving base station 1 100 and the energy saving base station 2 200.

However, as a result of the coverage coordination procedure, if it is determined that the coordinating base station 300 and the compensation base station 2 400 may not compensate for coverage of the energy saving base station 1 100 and the energy saving base station 2 200, the coverage coordinating signal transmitted to the energy saving base station 1 100 and the energy saving base station 2 200 at the steps S712 and S714 may include an idle mode switching unavailable message for not permitting power-off or switching to the idle mode.

Meanwhile, if the energy saving base station 1 100 and the energy saving base station 2 200 receive the coverage coordinating signal, which includes the idle mode switching indication message indicating idle mode switching permission, from the coordinating base station 300 at the steps S712 and S714, the energy saving base station 1 100 and the energy saving base station 2 200 perform handover for one or more user equipments located within their service area to one of the coordinating base station 300 and the compensation base station 2 400, which performs compensation for its coverage, and then perform power-off or switching to the idle mode (S715, S718).

At this time, although not shown in FIG. 7, after the message indicating power-off or switching to the idle mode is transmitted to neighboring base stations except the energy saving base station of which coverage is compensated by the same compensation base station before power-off or switching to the idle mode is performed, power-off or switching to the idle mode may be performed.

Meanwhile, each of the compensation base station 2 400 and the coordinating base station 300 that have received the coverage coordinating signal from the coordinating base station 300 at the step S713 may compensate for the coverage of the energy saving base station 1 100 and the energy saving base station 2 200 by extending its coverage (S716, S717).

Figure 8:
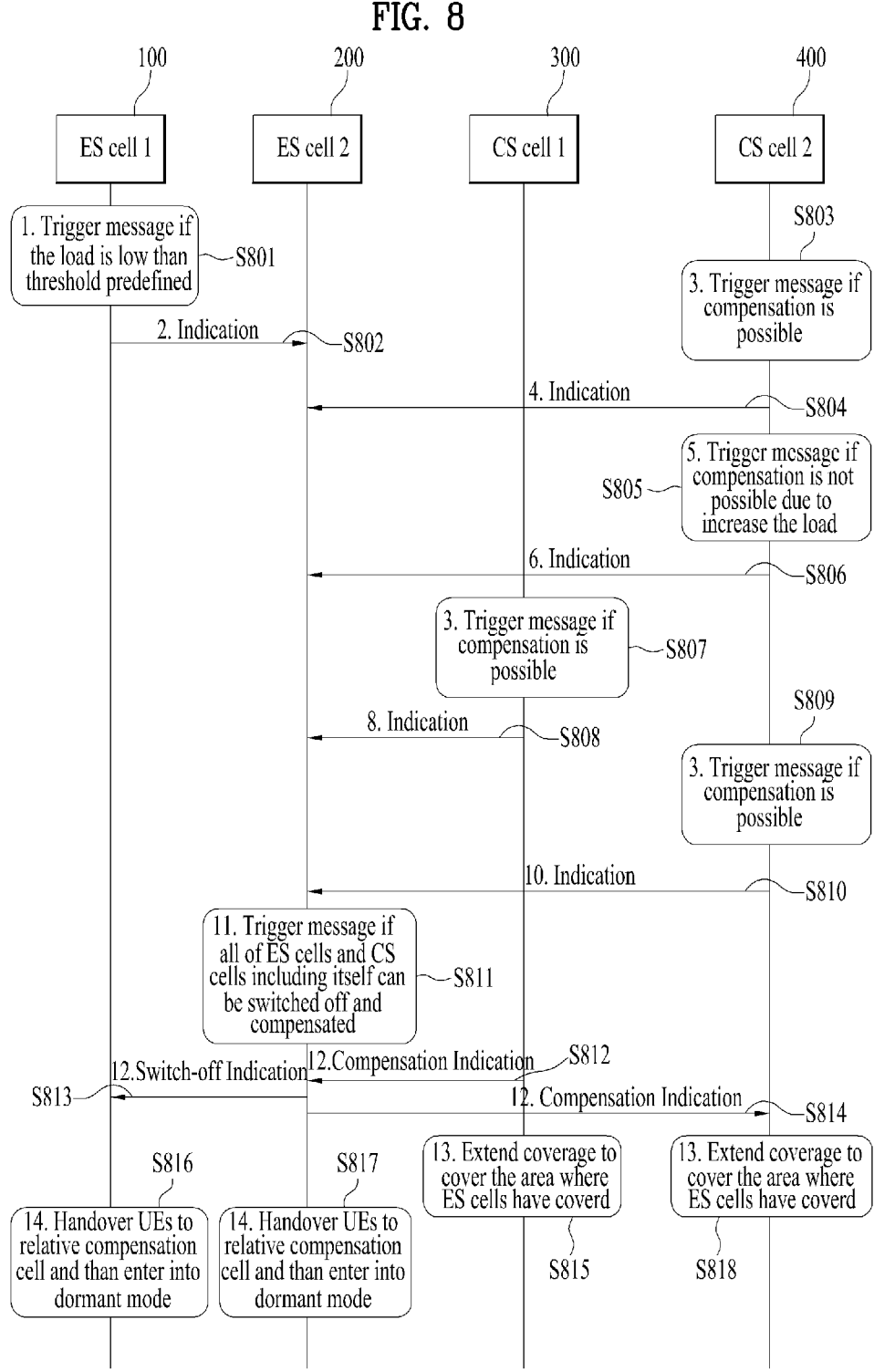
FIG. 8 is a diagram illustrating another method for enabling a base station to transmit a signal for coverage coordination in accordance with one embodiment of the present invention.

FIG. 8 is a diagram illustrating another method for enabling a base station to transmit a signal for coverage coordination in accordance with one embodiment of the present invention.

Referring to FIG. 8, the wireless communication system may include an energy saving base station 1 100, an energy saving base station 2 200, a compensation base station 1 300 and a compensation base station 2 400.

Meanwhile, in FIG. 8, it is assumed that the energy saving base station 2 200 serves as a coordinating base station unlike FIG. 7. It is also assumed that the energy saving base station 1 100, the compensation base station 1 300 and the compensation base station 2 400 recognize that the energy saving base station 2 200 is the coordinating base station in accordance with the procedure described in FIG. 6.

If cell load of the energy saving base station 1 100 maintains a predetermined threshold value or less for a predetermined time, the energy saving base station 1 100 may determine power-off or shift to the idle or dormant mode (S801). At this time, the energy saving base station 1 100 transmits a compensation request message or idle mode switching request message to the coordinating base station 200 which is previously known (S802), and the compensation request message or the idle mode switching request message may include information on a coverage of the energy saving base station 1 100.

Meanwhile, the compensation base station 2 400 may determine that coverage compensation is possible if the cell load maintains a predetermined threshold value or less for a predetermined time (S803). As a result, the compensation base station 2 400 may transmit coverage range information indicating its compensable coverage range or information indicating that compensation may be performed to reach the coverage range to the coordinating base station 200 (S804).

However, after the compensation base station 2 400 transmits coverage range information indicating its compensable coverage range or information indicating that compensation may be performed to reach the coverage range to the coordinating base station 200 at the step S804, if the cell load of the compensation base station 2 400 exceeds a predetermined threshold value, the compensation base station 2 400 may determine that coverage compensation cannot be performed (S805). As a result, the compensation base station 2 400 may transmit information indicating that coverage compensation cannot be performed to the coordinating base station 200 (S806).

At this time, the information indicating that coverage compensation can be performed at the step S804 and the information indicating that coverage compensation cannot be performed at the step S806 are transmitted as the same type messages but may be identified from each other as a value of 0 or 1.

Meanwhile, if cell load maintains a predetermined threshold value or less for a predetermined time, the compensation base station 1 300 may determine that coverage compensation can be performed (S807). As a result, the compensation base station 1 300 may transmit coverage range information indicating its compensable coverage range or information indicating that the coverage can be performed to reach the coverage range to the coordinating base station 200 (S808).

Also, after transmitting information indicating that coverage compensation cannot be performed at the step S806, the compensation base station 2 400 may again determine that coverage compensation may be performed if cell load again maintains a predetermined threshold value for a predetermined time (S809). As a result, the compensation base station 2 400 may again transmit coverage range information indicating its compensable coverage range or information indicating that compensation can be performed to reach the coverage range to the coordination base station 200 (S810).

Meanwhile, the coordination base station 200 that has received the compensation request message or the idle mode switching request message from the energy saving base station 1 100 at the step S802 performs the coverage coordination procedure that includes determining whether a coverage of the compensation base station 1 300 and a coverage of the compensation base station 2 400 may compensate for its coverage and coverage of the energy saving base station 1 100 by comparing information on a coverage of the energy saving base station 1 100, which is included in the compensation request message or the idle mode switching request message, and information on a coverage of the compensation base station 1 300 and the compensation base station 2 400, which is received at the steps S808 and S810, with each other (S811).

After performing the coverage coordination procedure at the step S811, the coordinating base station 200 may transmit the coverage coordinating signal determined in accordance with the result of the coverage coordination procedure to each of the energy saving base station 1 100, the compensation base station 1 300, and the compensation base station 2 400 (S812 to S814).

At this time, as a result of the coverage coordination procedure, if it is determined that the compensation base station 1 300 and the compensation base station 2 400 may compensate for the coverage of the energy saving base station 1 100 and the coverage of the coordination base station 200, the coverage coordinating signal transmitted from the coordinating base station 200 to the energy saving base station 1 100 at the step S813 may include an idle mode switching indication message indicating idle mode switching permission, and the coverage coordinating signal transmitted from the coordinating base station 200 to the compensation base station 1 300 and the compensation base station 2 400 may include a coverage compensation indication message indicating coverage compensation of the energy saving base station 1 100 and the coordinating base station 200.

However, as a result of the coverage coordination procedure, if it is determined that the compensation base station 1 300 and the compensation base station 2 400 may not compensate for the coverage of the energy saving base station 1 100 and the coordinating base station 200, the coverage coordinating signal transmitted to the energy saving base station 1 100 at the step S813 may include an idle mode switching unavailable message for not permitting power-off or switching to the idle mode.

Meanwhile, if the energy saving base station 1 100 receives the coverage coordinating signal, which includes the idle mode switching indication message indicating idle mode switching permission, from the coordinating base station 200 at the step S813, the energy saving base station 1 100 and the coordinating base station 200 perform handover for one or more user equipments located within their service area to one of the compensation base station 1 300 and the compensation base station 2 400, which performs compensation for its coverage, and then perform power-off or switching to the idle mode (S816, S817).

Meanwhile, each of the compensation base station 1 300 and the compensation base station 2 400 that have received the coverage coordinating signal from the coordinating base station 200 at the steps S812 and S814 may compensate for the coverage of the energy saving base station 1 100 and the coordinating base station 200 by extending its coverage (S815, S818).

Figure 9:
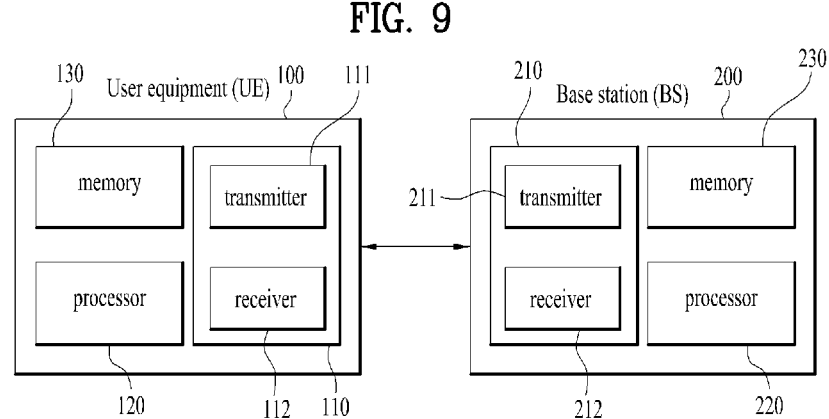
FIG. 9 is a block diagram illustrating a device for transmitting a signal for coverage coordination in accordance with one embodiment of the present invention.

FIG. 9 is a block diagram illustrating a device for transmitting a signal for coverage coordination in accordance with one embodiment of the present invention.

Although a 1:1 communication environment between a user equipment 100 and a base station 200 is shown in FIG. 9, a communication environment may be configured among a plurality of user equipments and a plurality of base stations, and a communication environment between a user equipment and a user equipment and a communication environment between a base station and a base station may be configured.

Referring to FIG. 9, a wireless communication system to which the present invention may be applied may include a user equipment 100 and a base station 200. The base station 200 may include a radio frequency (RF) unit 210, which includes a transmitter 211 and a receiver 212, a processor 220, and a memory 230.

A general procedure of communication such as signal processing and layer processing of the base station 200 is controlled by the processor 220 and the memory 230. Also, a connection relation may be formed among the RF unit 210, the processor 220, and the memory 230.

The RF unit 210 included in the base station 200 may include a transmitter 211 and a receiver 212. The transmitter 211 and the receiver 212 may be configured to transmit and receive to and from the user equipment 100 or the other base stations.

The processor 220 may be functionally connected with the transmitter 211 and the receiver 212 to control the signal transmission and reception process of the transmitter 211 and the receiver 212 to and from the user equipment 100 and the other base station. Also, the processor 220 may perform various kinds of processing for a signal for transmission and then transmit the processed signal to the transmitter 211, and may perform processing for the signal received by the receiver 212.

The processor 220 may store information included in the exchanged message in the memory 230 if necessary. The base station 200 configured as above may perform methods of various embodiments according to the present invention which has been described as above.

The RF unit 110 of the user equipment 100, which includes the transmitter 111 and the receiver 112, is configured to transmit and receive a signal to and from the base station 200. Also, the processor 120 of the user equipment 100 may be functionally connected with the transmitter 111 and the receiver 112 to control the signal transmission and reception process of the transmitter 111 and the receiver 112 to and from other devices including the base station 200.

Also, the processor 120 may perform various kinds of processing for a signal for transmission and then transmit the processed signal to the transmitter 111, and may perform processing for the signal received by the receiver 112.

The processor 120 may store information included in the exchanged message in the memory 130 if necessary.

Each processor 120, 220 of the user equipment 100 and the base station 200 commands (for example, controls, coordinates or manages) the operation of each of the user equipment 100 and the base station 200. Each processor 120, 220 may be connected with the memory 130, 230 that stores program codes and data therein. The memory 130, 230 is connected with the processor 120, 220 and stores an operating system, an application, and general files therein.

The processor 120, 220 of the present invention may be referred to as a controller, a microcontroller, a microprocessor, or a microcomputer. In the meantime, the processor 120, 220 may be implemented by hardware, firmware, software, or their combination.

If one embodiment of the present invention is implemented by firmware or software, one embodiment of the present invention may be implemented in the form of a module, a process, or a function, which performs functions or operations described as above. A software code may be stored in the memory 130, 230 and then may be driven by the processor 120, 220. The memory may be located inside or outside the user equipment 100 and the base station 200, and may transmit and receive data to and from the processor 120, 220 through various means which are already known.

If one embodiment of the present invention is implemented by hardware, the processor 120, 120 may include application specific integrated circuits (ASICs), digital signal processors (DSPs), digital signal processing devices (DSPDs), programmable logic devices (PLDs), and field programmable gate arrays (FPGAs), which are configured to perform the present invention.

In the meantime, the aforementioned method may be drafted in a program that may be executed in a computer, and may be implemented in a general-use digital computer that operates the program by using a computer readable medium. Also, a structure of data used in the aforementioned method may be recorded in the computer readable medium through several means. It is not to be understood that program memory devices, which may be used to describe a memory device that includes an executable computer code for performing various methods of the present invention, include temporary targets such as carrier waves or signals. The computer readable medium includes a storage medium such as a magnetic medium (for example, floppy disk, hard disk, etc.) and an optical readable medium (for example, CD-ROM, DVD, etc.).

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for transmitting a signal for coverage coordination from a base station in accordance with the present invention may be applied to various wireless communication systems.

The invention claimed is:

1. A method for transmitting a signal for coverage coordination by a base station in a wireless communication system, the method comprising:
    transmitting, by a coordinating base station, information notifying the coordinating base station to each of a first base station and a second base station;
    receiving, by the coordinating base station, coverage related information from each of the first base station and the second base station, the coverage related information of the first base station including an idle mode switching request of the first base station, the coverage related information of the second base station including information on a coverage area compensated for by the second base station, the coverage related information of the first base station being received from the first base station when a cell load of the first base station maintains a predetermined threshold value or less for a predetermined time;
    performing a coverage coordination procedure by using the coverage related information of the first and second base stations; and
    transmitting a coverage coordinating signal determined in accordance with the result of the coverage coordinating procedure to each of the first and second base stations, the coverage coordination procedure including determining whether the second base station compensates for a coverage of the first base station when the first base station is switched to an idle mode.

2. The method according to claim 1, further comprising:
    configuring an X2 interface between the coordinating base station and each of the first and second base stations,
    wherein, when the X2 interface is configured, it is notified that the coordinating base station determines whether to perform coverage coordination or not.

3. The method according to claim 1, further comprising:
    receiving an idle mode switching request cancellation message indicating that switching to an idle mode will not be performed from the first base station if the cell load of the first base station exceeds a predetermined threshold value after receiving the coverage related information of the first base station,
    wherein the idle mode switching request and the idle mode switching request cancellation message of the first base station are identified from each other as a value of 0 or 1.

4. The method according to claim 1, wherein, if it is determined that the second base station compensates for the coverage of the first base station as a result of the coverage coordination procedure:
    the coverage coordinating signal transmitted to the first base station includes an idle mode switching indication message; and
    the coverage coordinating signal transmitted to the second base station includes a coverage compensation indication message indicating coverage compensation of the first base station.

5. The method according to claim 4, wherein the idle mode switching indication message indicates that the first base station performs handover for one or more user equipments located within a service area of the first base station to the second base station and then is switched to an idle mode.

6. The method according to claim 4, wherein:
    the coverage compensation indication message indicates that the second base station compensates for the coverage of the first base station; and
    the coverage is compensated in such a manner that the second base station continuously provides one or more user equipments receiving a service from the first base station, with the service.

7. The method according to claim 1, wherein the coverage coordinating signal transmitted to the first base station includes an idle mode switching unavailable message if coverage compensation of the first base station is not possible.

8. A device for transmitting a signal for coverage coordination in a wireless communication system, the device comprising:
    a radio frequency (RF) unit that includes a transmitter and a receiver; and
    a processor operably connected with the transmitter and the receiver, supporting communication of the device, the processor being configured to:
        transmit information notifying the coordinating base station to each of a first base station and a second base station;
        receive coverage related information from each of the first base station and the second base station, the coverage related information of the first base station including an idle mode switching request of the first base station, the coverage related information of the second base station including information on a coverage area compensated for by the second base station, the coverage related information of the first base station being received from the first base station when a cell load of the first base station maintains a predetermined threshold value or less for a predetermined time;
        perform a coverage coordination procedure by using the coverage related information of the first and second base stations; and
        transmit a coverage coordinating signal determined in accordance with the result of the coverage coordination procedure to each of the first and second base stations, the coverage coordination procedure including determining whether the second base station compensates for a coverage of the first base station when the first base station is switched to an idle mode.

* * * * *